United States Patent [19]
Ohtomo

[11] Patent Number: 5,539,724
[45] Date of Patent: Jul. 23, 1996

[54] OPTICAL DISK HAVING WOBBLED, DISCONTINUOUS GROOVES

[75] Inventor: Katsuhiko Ohtomo, Miyagi, Japan

[73] Assignee: Sony Corporation, Tokyo, Japan

[21] Appl. No.: 471,615

[22] Filed: Jun. 5, 1995

Related U.S. Application Data

[63] Continuation of Ser. No. 142,946, Oct. 29, 1993, abandoned.

[30] Foreign Application Priority Data

Oct. 30, 1992 [JP] Japan ........................... 4-293310

[51] Int. Cl.$^6$ ........................................... G11B 7/24
[52] U.S. Cl. ........................... 369/275.4; 369/44.13; 369/277
[58] Field of Search ..................... 369/275.4, 275.3, 369/44.13, 275.1, 277

[56] References Cited

U.S. PATENT DOCUMENTS

| | | | |
|---|---|---|---|
| 4,364,118 | 12/1982 | Maeda | 369/44 |
| 4,982,398 | 1/1991 | Yamamoto | 369/44.13 |
| 5,084,860 | 1/1992 | Maeda | 369/275.3 |
| 5,210,733 | 5/1993 | Yamaguchi | 369/48 |
| 5,303,216 | 4/1994 | Shinoda | 369/44.13 |
| 5,317,553 | 5/1994 | Ohga | 369/275.4 X |

FOREIGN PATENT DOCUMENTS

| | | |
|---|---|---|
| 0178657 | 4/1986 | European Pat. Off. . |
| 0265695 | 5/1988 | European Pat. Off. . |
| 0326206 | 8/1989 | European Pat. Off. . |
| 0399852 | 11/1990 | European Pat. Off. . |
| 63-87682 | 4/1988 | Japan . |

*Primary Examiner*—David C. Nelms
*Assistant Examiner*—Son Mai
*Attorney, Agent, or Firm*—Hill, Steadman & Simpson

[57] ABSTRACT

A rotation of an optical disk can be controlled with high accuracy to thereby reduce a rotational jitter, whereby a buffer area between sectors can be reduced to increase a storage capacity of the optical disk. In an optical disk in which a track (3) defined by a groove (2) is formed on a rotational base plate and a recording pit (4) corresponding to information is formed on the track (3) in a multi-channel fashion, the groove (2) is formed as a pattern which is fine wobbled in the optical disk radiation direction shown by an arrow (r) and address information (9) of the track (3) is provided in the groove (2).

5 Claims, 4 Drawing Sheets

OPTICAL DISK HAVING WOBBLED, DISCONTINUOUS GROOVES

This is a continuation of application Ser. No. 08/142,946, filed Oct. 29, 1993, abandoned.

BACKGROUND OF THE INVENTION

1. Field of the Invention

The present invention relates to an optical disk on and/or from which information is recorded and/or reproduced in the form of recording pits by effectively utilizing concave and convex patterns, a modulation of reflective index, a magneto-optical effect or the like, for example.

2. Description of the Related Art

In optical disks such as a compact disc (CD) and a mini-disk (MD) in which recording pits are formed by effectively utilizing concave and convex portions formed on the disk surface, the phase change, the magneto-optical effect or the like, a rotational jitter must be reduced by rotating the disk with high accuracy to thereby suppress a read-out error.

In the case of a CAV (constant angular velocity) system optical disk, a rotation synchronizing signal is obtained not from the optical disk but from an encoder pulse of a spindle that rotates the optical disk. In the case of a CLV (constant linear velocity) system optical disk, a rotational speed of a spindle is controlled such that a synchronizing signal of a header portion recorded on the optical disk in advance may have a predetermined frequency.

General optical disks have only several 10 s of sectors formed in one track and therefore a frequency of the synchronizing signal becomes less than about 1 kHz. Therefore, even when the rotational speed of the spindle is controlled with higher accuracy, the rotational jitter cannot be suppressed sufficiently. As a result, a buffer area between the sectors must be increased in area, which makes it impossible to increase a storage capacity of the optical disk.

When a video signal is stored in the optical disk in the form of an analog signal, a rotation synchronizing signal of the optical disk has a frequency of 30 kHz in view of a recording density relationship because the synchronizing signal of the NTSC video signal has a frequency of 30 kHz. At that time, if the optical disk is rotated at the CLV mode, then the buffer area between the sectors is increased because the rotational jitter must be suppressed, thereby making it impossible to realize the increase of the storage capacity of the optical disk.

Further, when a wide band signal such as an HD (high definition) (MUSE) signal is recorded on and reproduced from the optical disk, a data transfer rate must be increased (band of the recording signal must be widened in the case of the analog signal). In the single channel system, as means for increasing the data transfer rate, it is proposed to increase a relative speed between the optical disk and the laser beam. However, when a recording density of the optical disk is increased, a laser beam having a short wavelength is required or an optical disk made of a perfectly new material is also required. In addition, a laser beam of a larger intensity is needed to increase the above relative speed.

OBJECTS AND SUMMARY OF THE INVENTION

Therefore, it is an object of the present invention to provide an improved optical disk in which the aforesaid shortcomings and disadvantages encountered with the prior art can be eliminated.

More specifically, it is an object of the present invention to provide an optical disk in which a rotation of a spindle can be controlled with higher accuracy to thereby reduce a rotational jitter.

Another object of the present invention is to provide an optical disk in which a buffer area between sectors can be reduced to thereby increase a substantial storage capacity.

A further object of the present invention is to provide an optical disk in which a wide band signal such as an HD (high definition) signal (e.g., MUSE signal) can be recorded and reproduced without changing a revolution rate of the optical disk.

According to an aspect of the present invention, there is provided an optical disk in which a track is formed on a disk base plate and a recording pit corresponding to information is formed on the track in a multi-channel fashion. A groove that defines the track is formed as a pattern which is fine wobbled in the radial direction of the optical disk and address information of the track is provided in the groove.

Further, according to the present invention, there is provided the above-mentioned optical disk in which a wobbling amplitude of the groove is selected to be greater than 25 nm and less than 50 nm.

Furthermore, according to the present invention, there is provided the optical disk in which the recording pit is formed as a pattern which is read out when the optical disk is rotated at a constant angular velocity.

In addition, according to the present invention, there is provided the optical disk in which the recording pit is formed as a pattern which is read out when the optical disk is rotated at a constant linear velocity.

As described above, according to the present invention, the recording pit associated with information is formed on the optical disk and the groove that defines the track is formed on the optical disk as the pattern which is fine wobbled in the radial direction of the optical disk. Therefore, the rotation of the optical disk can be controlled with high accuracy by using the wobbling signal obtained due to the above wobbling. Also, since the address information is provided in the groove as the groove pattern, the address information area need not be provided and a data signal can be recorded on land portions (tracks) formed at both sides of the groove. Hence, a storage capacity of the optical disk can be increased.

Since the wobbling amplitude of the groove is selected to be less than 50 nm, an output ratio of the wobbling signal relative to a data signal such as a video signal can be suppressed. Further, since the wobbling amplitude of the groove is selected to be greater than 25 nm, a C/N of the wobbling signal can be increased sufficiently, whereby the rotation of the optical disk can be controlled with high accuracy and a read-out error can be suppressed.

Further, at that time, since the rotation of the spindle motor and the recording and reproducing frequency can be made constant by recording the recording pit as the recording pit of the CAV system, the circuit of the drive apparatus using this optical disk can be simplified and miniaturized.

Furthermore, since the recording/reproducing condition can be made substantially the same at any position on the optical disk by recording the recording pit as the recording pit of the CLV system, the drive apparatus using this optical disk can be miniaturized and simplified similarly as described above, and the storage capacity of the optical disk can be increased.

As described above, according to the present invention, the rotation of the optical disk can be controlled with high accuracy to suppress the rotational jitter, whereby the read-out error can be reduced. Also, since the address information is provided in the groove, the data area can be increased substantially, and therefore the storage capacity of the optical disk can be increased by about 3 to 4%.

Since the frequency of the rotation synchronizing signal recorded on the optical disk can be increased, the accuracy of the rotation control system of the disk drive apparatus need not be increased more than is necessary. Thus, the arrangement of the electrical circuit of the disk drive apparatus can be simplified and the disk drive apparatus can be miniaturized, simplified and made inexpensive. Also, since the recording pits are formed at both sides of the groove to effect the recording and reproducing in a multi-channel fashion, the wide band signal such as an HD (high definition) signal, i.e., a MUSE signal can be recorded without increasing the revolution rate of the optical disk.

Further, since the wobbling amplitude of the groove is selected to be greater than 25 nm and less than 50 nm, the crosstalk component of the wobbling signal can be suppressed and the C/N of the wobbling signal can be increased sufficiently. Therefore, the rotation of the optical disk can be controlled with high accuracy and also the read-out error can be suppressed.

Further, at that time, since the rotation of the spindle motor and the recording and reproducing frequency can be made constant by recording the recording pit as the recording pit of the CAV system, the circuit arrangement of the disk drive apparatus using this optical disk can be simplified and miniaturized.

Furthermore, since the recording/reproducing condition can be made substantially the same at any position on the optical disk by recording the recording pit as the recording pit of the CLV system, the disk drive apparatus using this optical disk can be miniaturized and simplified similarly as described above, and the storage capacity of the optical disk can be increased.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

An optical disk according to an embodiment of the present invention will now be described with reference to the drawings.

In this embodiment, a video signal is recorded on a so-called WO (Write Once) disk in which data that was once written cannot be erased and therefore the recording cannot be effected again, by way of example. The WO disk can be accessed at high speed as compared with a conventional tape-shaped medium. Data can be recorded on the WO disk for 3 minutes in a CAV system and recorded on the WO disk for 10 minutes at maximum in a CLV system.

In this embodiment, the WO disk is formed as a so-called Low-to-High type in which a recording layer deposited on the disk base plate is formed as a WO film and a recording pit is formed as, for example, a reflectivity changing type whose reflectivity is increased after the recording. If the WO disk is formed as the Low-to-High type, then the quality of recording pit is excellent and a reliability thereof becomes high as compared with an optical disk of a so-called hole-making type in which recording pits are formed by concave and convex portions formed on the surface of the disk base plate.

Figure 1:
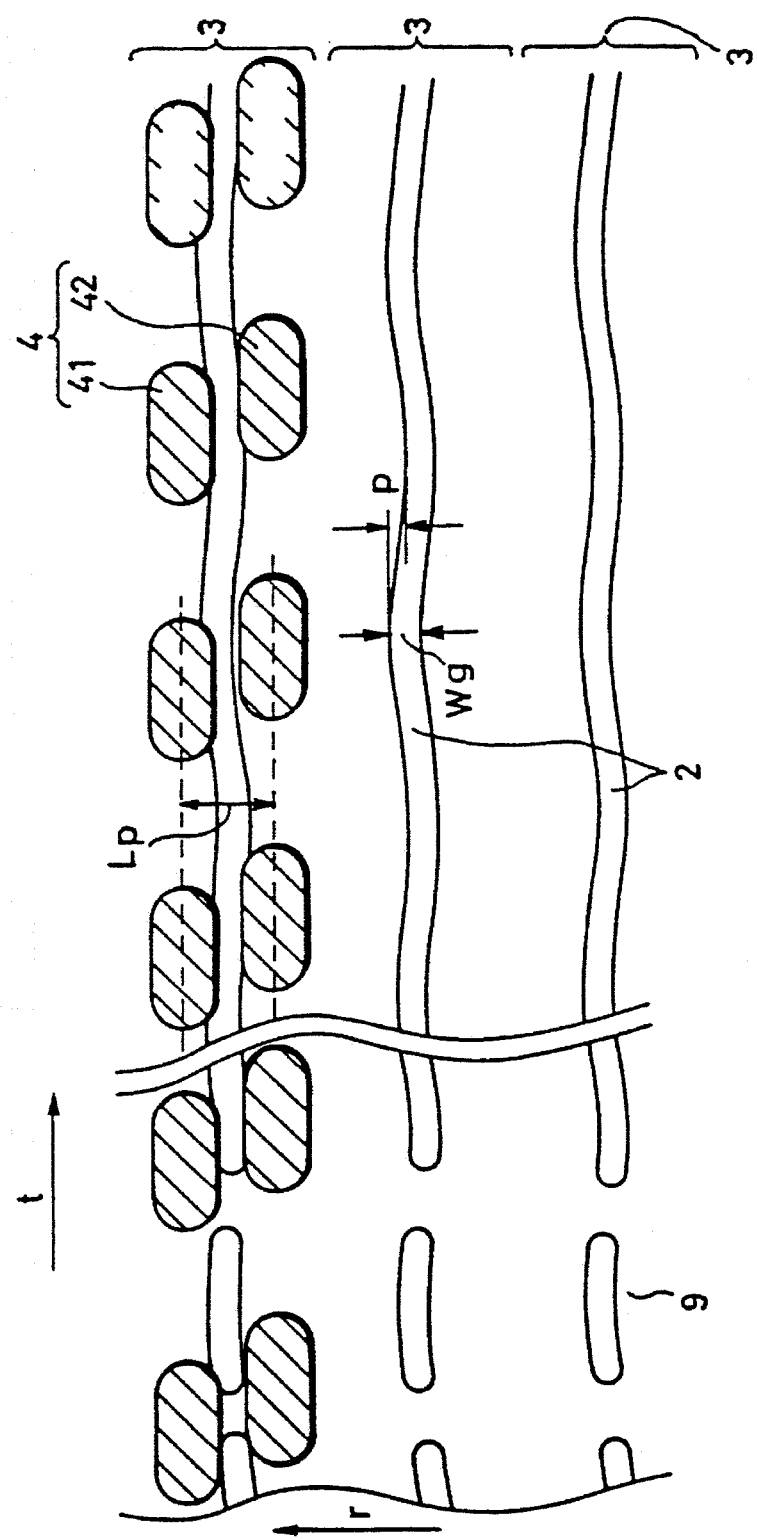
FIG. 1 is a schematic diagram used to explain the embodiment of the present invention.

As shown in FIG. 1, in this embodiment, grooves 2 are formed as patterns which are fine wobbled in the disk radial direction shown by an arrow r.

A method of forming such grooves is described in Japanese laid-open patent publication No. 63-87682 corresponding to U.S. Pat. No. 4,942,565 proposed by the same assignee of the present application. According to this groove forming method, after a photo-resist was coated on a disk base plate formed of a glass disk or the like, such disk is rotated by a spindle motor in a CAV or CLV fashion and a light beam is wobbled and radiated on the disk surface along the disk radial direction by a mirror rotated by a motor, for example. Thereafter, the disk is developed and pre-grooves of spiral shape wobbled in the radial direction of the disk are formed on the disk.

In this embodiment, a wobbling frequency of a light beam was selected to be 2.088 MHz in a constant linear velocity (CLV), a width Wg of the groove 2 was selected to be about 0.5 μm, and a width p from the peak of the amplitude of the groove 2 to the peak was selected to be 100 nm, i.e., wobbling amplitude was selected to be 50 nm. An arrow t in FIG. 1 shows an extended direction of the track 3.

At both sides of the groove 2, there are formed recording pits 4 (41 and 42) of first and second channels. In order to effect the two-channel recording and reproduction, a spacing between the grooves 2 is selected to be 3.2 μm which is twice the track spacing of the ordinary optical disk. A spacing Lp across the groove 2 between the recording pits 41 and 42 is set to be 1.6 μm.

The recording pits 4 are formed in accordance with the CLV system as described above, whereby the recording and reproducing condition can be made substantially the same at any position on the optical disk. Therefore, a disk drive apparatus using this optical disk can be miniaturized and simplified in arrangement. Also, the recording capacity of the optical disk can be increased.

More specifically, the two-channel recording pits 41, 42 can be recorded on the track 3. Address information 9 of the track 3 is formed on the same track by the groove 2 as concave and convex patterns in response to information. In this case, an area that is exclusively used to provide the address information 9 therein need not be provided on the optical disk and therefore the storage capacity of the optical disk can be increased.

When this optical disk is applied to an optical disk of 1 kB/sector arrangement, 1 sector=1360 B and a header portion thereof is 52 B. Thus, $52/1360 \approx 3.8\%$ and the storage capacity of the optical disk can be increased by 3 to 4%.

In FIG. 1, shapes of the groove 2 and the recording pit 4 are illustrated schematically, and magnifying ratios of widths and spacings thereof are made different, respectively. For example, a period of the recording pit 4 in the track direction shown by the arrow t is about 1.4 μm when an FM-modulated signal having a frequency of 16.3 MHz is recorded. This period is considerably short as compared with the wobbling period.

A positional relationship between the groove 2 and the recording pit 4 is not limited to the above-mentioned example and the recording pits 41, 42 may be formed at positions in which two channels do not sandwich the groove 2. While the wobbling phases of the grooves 2 are matched with each other at every tracks 3 as shown in FIG. 1, the wobbling phases of the grooves 2 are not always matched with each other.

Figure 2:
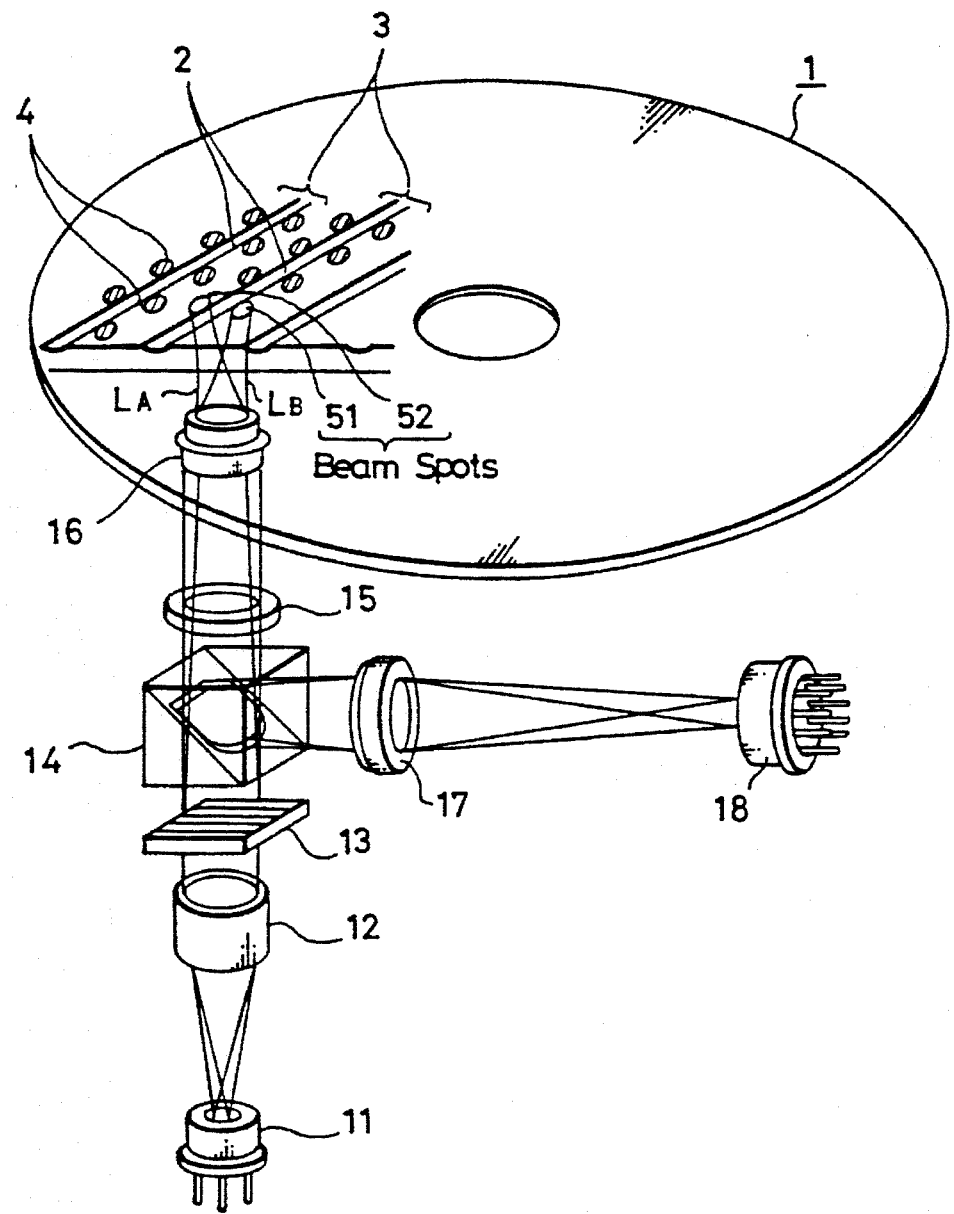
FIG. 2 is a schematic perspective view showing a two-channel optical head used in the present invention.
Figure 3A:
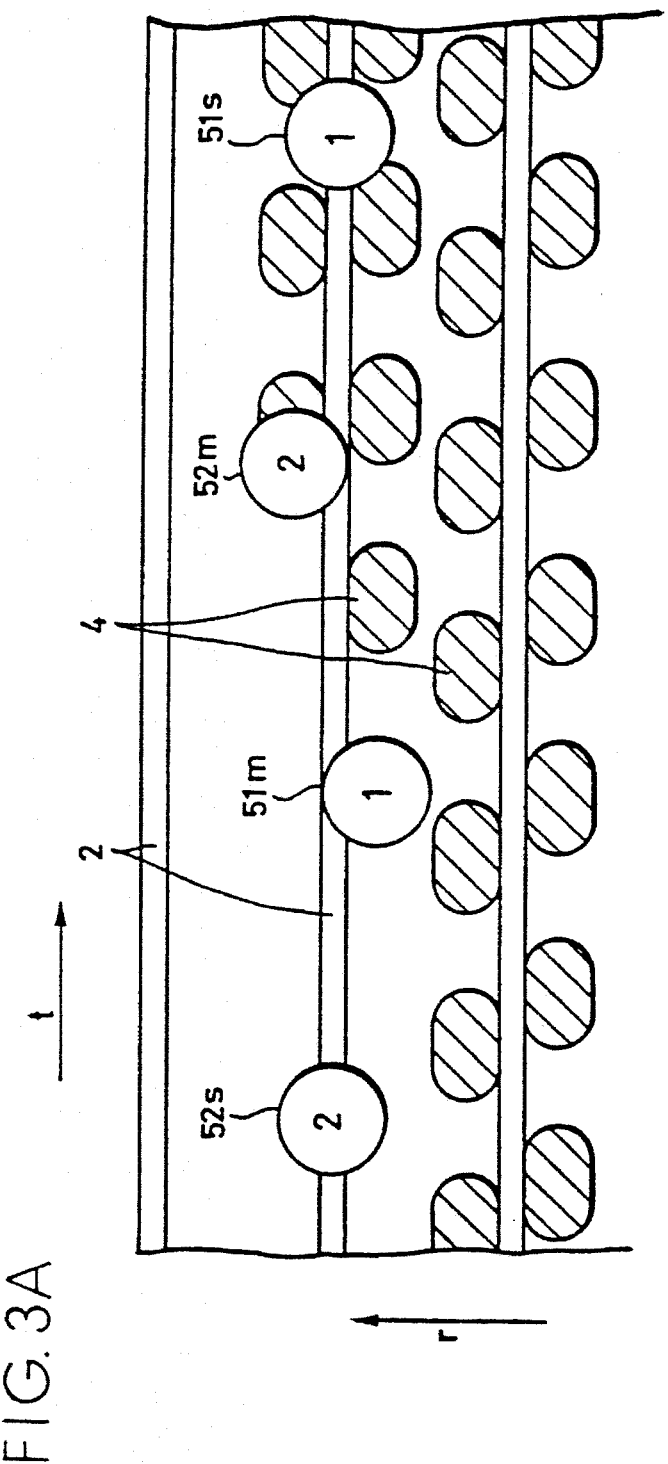
FIGS. 3(A–E) is a diagram used to explain the embodiment of the present invention.
Figure 3B:
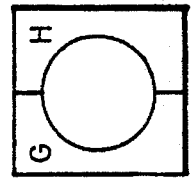
Figure 3C:
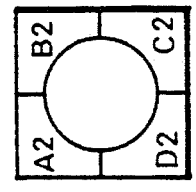
Figure 3D:
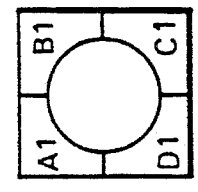
Figure 3E:
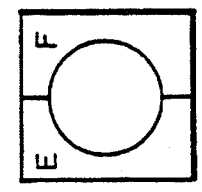

With the above-mentioned arrangement, the two laser beams are utilized and the two-channel recording and reproduction can be carried out by the two laser beams, thereby realizing the transfer rate twice as high as the ordinary transfer rate. As, for example, shown in a schematic arrangement of FIG. 2, the reproduction is carried out by a two-channel optical head. FIG. 2 schematically shows the grooves 2 and the tracks 3 on the optical disk 1 in an enlarged scale.

As shown in FIG. 2, in this optical head, there is used a laser diode 11 of a monolithic 2-channel laser structure. Laser beams from the laser diode 11 are introduced through a collimator lens 12 to a grating 13, in which two laser beams are separated into three laser beams of a zero-order laser beam and two first-order laser beams. Beam spots 51, 52 are located such that the 0-order laser beam is used as a main spot beam to record and reproduce data and one of the first-order laser beam is used as a side spot laser beam to scan the groove 2. In FIG. 2, reference numeral 14 denotes a beam splitter, 15 a quarter wavelength plate and 16 an objective lens, respectively. A reflected-back laser beam from the optical disk 1 is reflected by the beam splitter 14 and detected by a photo-diode 18 through a lens 17.

FIGS. 3A–3E shows the state that the optical disk 1 is radiated with such beam spots. In FIGS. 3A–3E, the wobbling of the groove 2 is not shown for simplicity. Further, in FIGS. 3A–3E, like parts corresponding to those of FIG. 1 are marked with the same references and therefore need not be described in detail. In FIGS. 3A–3E, reference symbols 51m and 52m respectively show reproduced states presented when the recording pits 41 and 42 are respectively scanned by first and second channel main beam spots on the basis of the change of reflectivity, for example. Reference symbols 51s and 52s respectively show the states presented when the grooves 2 are respectively scanned by the first and second main beam spots to thereby read out the wobbling signal and the address information. Incidentally, the tracking servo control is effected by a synthesized signal of four laser beam spots. In FIGS. 3A–3E, reference symbols 61m and 62m respectively show the states that the reflected beam is detected by a quadrant photo-diode. Further, reference symbols 61s and 62s schematically show the states that the reflected beam is detected by a half photo-detector, respectively.

Similarly as described above in connection with Japanese laid-open patent publication No. 63-87682 (corresponding to U.S. Pat. No. 4,942,565), this wobbling signal is converted by a modulating circuit into a predetermined pulse train, limited in high band and low band, digital-to-analog converted, and then limited in low band in an analog fashion, thereby being read out.

Figure 4:
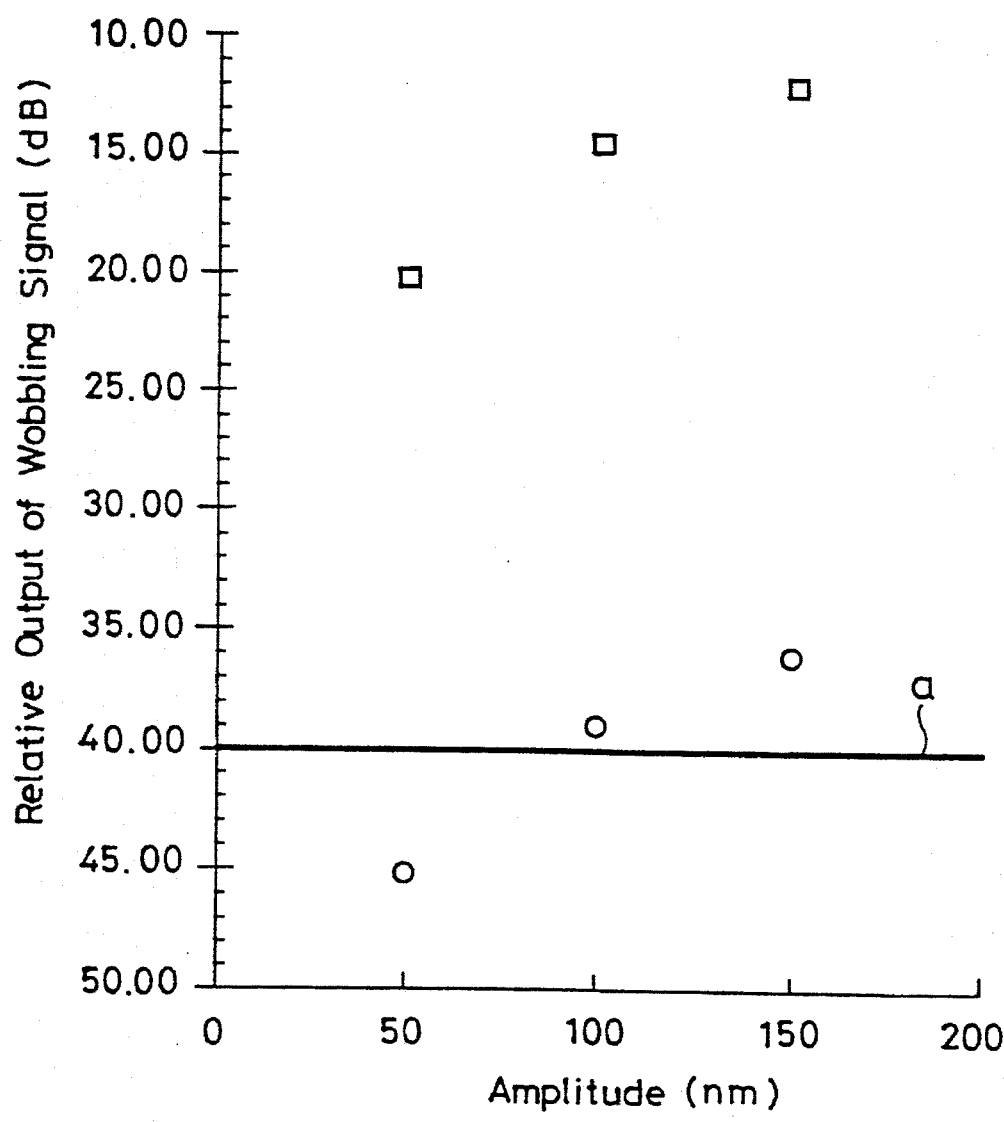
FIG. 4 is a diagram showing a relationship between a wobbling amplitude and a wobbling signal.

With the above-mentioned arrangement, an output ratio of the wobbling signal relative to the video signal was measured. FIG. 4 shows measured results thereof. In FIG. 4, open squares show measured results of output ratio of the wobbling signal relative to a base band signal, and open circles show measured results of output ratio of the wobbling signal relative to a sideband signal, respectively. The sideband signal cannot be utilized as the video signal if the output ratio of the wobbling signal becomes higher than 40 dB and therefore must be selected to be less than 40 dB as shown by a solid line a in FIG. 4. In this embodiment, when the amplitude of the wobbling of the groove 2 was selected to be 50 nm, for example, a satisfactory video signal could be obtained.

On the other hand, when the amplitude of the wobbling of the groove 2 is reduced, a C/N (carrier-to-noise ratio) is lowered. The wobbling signal needs a C/N of about 35 dB, and an amplitude at that time was about 25 nm. Accordingly, by selecting the amplitude of the wobbling of the groove 2 to be greater than 25 nm and less than 50 nm, a sufficient C/N can be obtained and a crosstalk component of the wobbling signal can be suppressed.

Incidentally, the output ratio of the wobbling signal relative to the baseband must be made less than 28 dB. In this case, the wobbling frequency is lowered and then the level can be lowered by a filter provided in a signal processing circuit, for example.

As described above, the wobbling signal having the high frequency of 2 MHz is used as the rotation synchronizing signal recorded on the optical disk 1, thereby reducing irregular rotation of the optical disk 1 due to the jitter component provided after the phase was controlled. More specifically, according to the present invention, the accuracy of the rotation control system of the disk drive apparatus need not be improved more than is necessary. Therefore, an electrical circuit system thereof can be simplified and a manufacturing cost thereof can be reduced.

While the recording pit 4 is formed as the pattern that can be read in the CLV system as described above, the present invention is not limited thereto and the recording pit 4 is formed as the pattern that can be read out in the CAV system where the angular velocity is made constant. In this case, the rotation of the spindle motor and the recording and reproducing frequency can be made constant so that the circuit arrangement of the optical disk drive apparatus using this optical disk can be simplified and miniaturized.

Furthermore, present invention is not limited to the WO (write once) optical disk and may be applied to a so-called erasable recording optical disk which is formed of a magneto-optical recording material or a phase change material. In addition, the present invention is not limited to the optical disk in which the recording pits are formed in a two-channel fashion and may be applied to an optical disk in which recording pits are formed in a multi-channel fashion.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An optical disk in which tracks are formed on a disk base plate and recording pits corresponding to information are formed on said tracks in a multi-channel fashion, comprising:

grooves that define said tracks being formed as discontinuous grooves formed around said disk which are fine wobbled in the radial direction of said disk base plate;

address information of said tracks being provided by a groove pattern formed by said discontinuous grooves; and a pattern of recording pits of a program recorded on said disk arranged on opposite sides of said grooves on said tracks continuously around said disk without allocated address sectors.

2. An optical disk in which tracks are formed on a disk base plate and recording pits corresponding to information are formed on said tracks in a multi-channel fashion, comprising:

grooves that define said tracks being formed as patterns which are fine wobbled in the radial direction of said disk base plate;

address information of said tracks being provided by said grooves; and recording pits of said disk are provided at both sides of said groove and said pits are recorded and reproduced simultaneously by two laser beams.

3. An optical disk in which tracks are formed on a disk base plate and recording pits corresponding to information are formed on said tracks in a multi-channel fashion, comprising:

grooves that define said tracks being formed as patterns which are fine wobbled in the radial direction of said disk base plate;

address information of said tracks being provided by said grooves; and an amplitude of a wobbling of said groove is selected to be greater than 25 nm and less than 50 nm.

4. An optical disk in which tracks are formed on a disk base plate and recording pits corresponding to information are formed on said tracks in a multi-channel fashion, comprising:

grooves that define said tracks being formed as discontinuous grooves which are fine wobbled in the radial direction of said disk base plate;

address information of said tracks being provided by said discontinuous grooves; and recording pits are formed as a pattern corresponding to a program recorded on said disk base plate which is read out when said optical disk is rotated at a constant angular velocity, said pattern of recording pits arranged continuously around said grooves without allocated space for address sectors.

5. The optical disk according to claim 1, wherein said recording pits are read out when said optical disk is rotated at a constant linear velocity.

* * * * *